Figure 1:
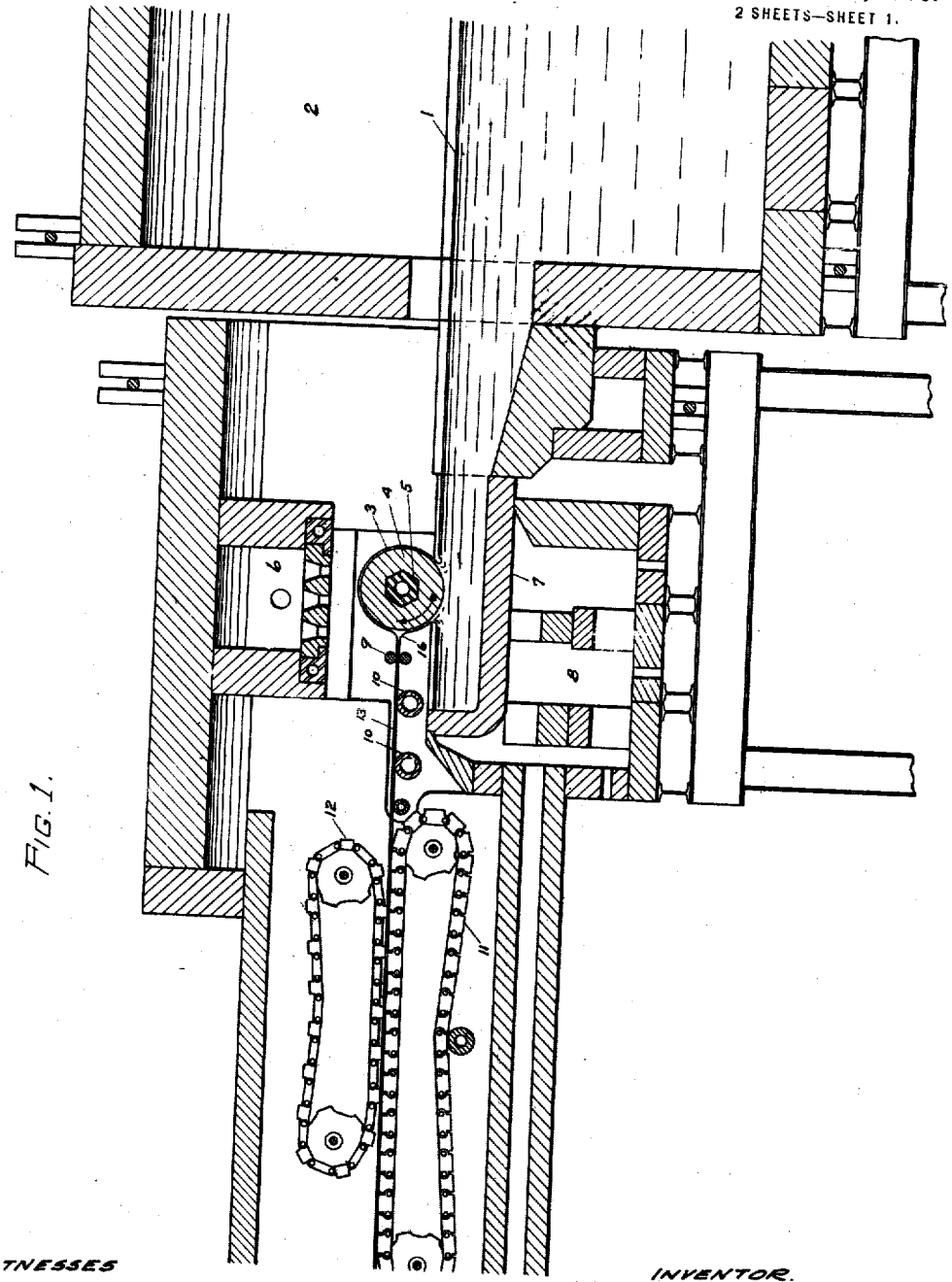

J. P. CROWLEY.
METHOD OF AND APPARATUS FOR DRAWING CONTINUOUS SHEETS OF GLASS.
APPLICATION FILED MAR. 15, 1917.
1,328,268.
Patented Jan. 20, 1920.
2 SHEETS—SHEET 2.
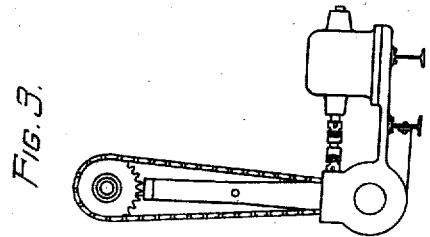
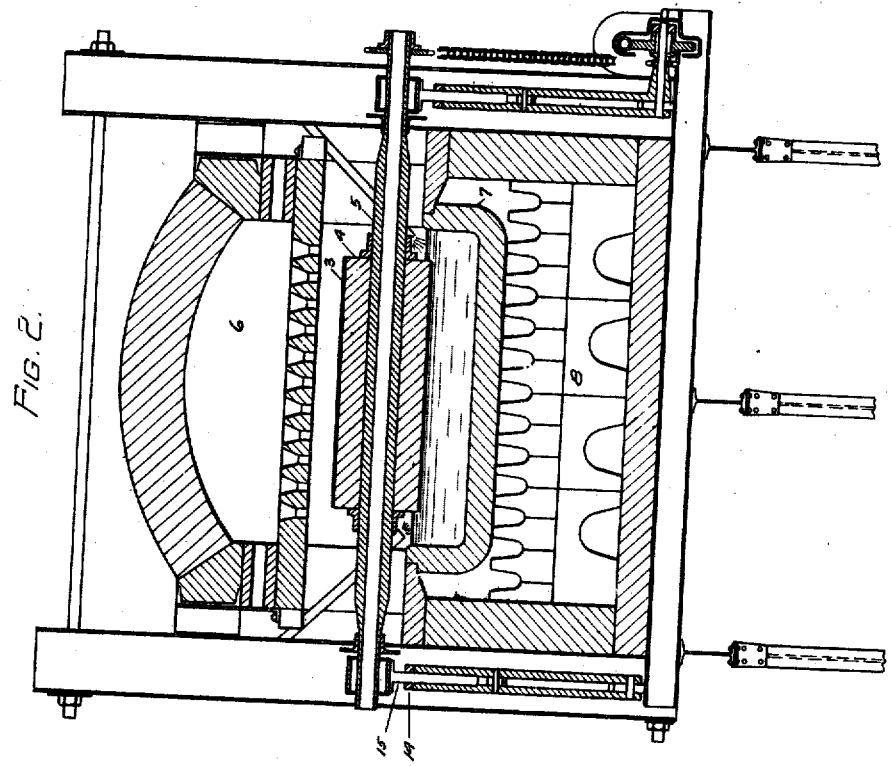
WITNESSES
INVENTOR
Joseph P. Crowley

UNITED STATES PATENT OFFICE.

JOSEPH P. CROWLEY, OF TOLEDO, OHIO, ASSIGNOR TO THE LIBBEY-OWENS SHEET GLASS COMPANY, OF CHARLESTON, WEST VIRGINIA, A CORPORATION OF OHIO.

METHOD OF AND APPARATUS FOR DRAWING CONTINUOUS SHEETS OF GLASS.

1,328,268.　　　　Specification of Letters Patent.　　Patented Jan. 20, 1920.

Application filed March 15, 1917. Serial No. 155,001.

*To all whom it may concern:*

Be it known that I, JOSEPH P. CROWLEY, a citizen of the United States, residing at Toledo, in the county of Lucas and State of Ohio, have invented certain new and useful Improvements in the Methods of and Apparatus for Drawing Continuous Sheets of Glass, of which the following is a specification.

My invention relates to certain new and useful improvements in methods of and apparatus for drawing continuous sheets of glass. To my knowledge continuous sheet glass is now commercially made by but one process, and that is covered by Patent Numbers 876,267, 966,652, 966,653, 973,002 and 1,160,692. In such process the glass is drawn vertically and bent over a roll to a horizontal position. The glass as it passes over the roll is comparatively soft and plastic, with only a very thin surface glaze so that it takes the impression of the roll surface and is always more or less marred thereby.

The primary object of my invention is to avoid bending of the sheet, to thereby eliminate roll impressions and produce the best possible grade of sheet glass mechanically, and at the same time permit the speed of drawing to be increased.

Other objects of the invention and the exact nature thereof will appear hereinafter.

An embodiment of my invention is illustrated in the accompanying drawings wherein:

Figure 1 is a longitudinal section through the working end of the tank, pot, roll and drawing apparatus. Fig. 2 is a transverse section through the pot and roll. Fig. 3 is a side elevation showing one of many drives that can be employed to rotate the roll.

Referring to Fig. 1, the molten glass 1 is prepared in the customary way in the melting tank and flows from the working end 2 of the tank into an adjoining pot or drawing chamber 7. The temperature of the glass in the pot is regulated by a heating chamber 8 beneath the pot. A glass gathering roll 4, preferably made of clay, but which can be of any suitable material, is mounted on a shaft 5, preferably non-circular in cross-section for driving the roll. My invention is not limited to this construction of roll, as I could use a roll made in one piece without a shaft, or the roll could be made in sections mounted on the shaft. The present invention comprehends the use of any roll adapted to the process herein set forth, regardless of its construction. Above the roll 4 is a fire or wind box 6. The mechanism for drawing a sheet of glass comprises the knurled rolls 9, carrier rolls 10, draw table 11 and clamp bars 12, this form of drawing mechanism being shown in the Patents 867,948 and 876,267 hereinbefore mentioned.

The roll 4 dips into the molten glass 1 and is continuously rotated in the direction indicated by the arrow (Fig. 1). This causes the roll to gather glass which adheres to the roll and forms a layer covering the entire surface of the roll. The length of the roll corresponds with the width of the sheet to be drawn. In commencing to draw a sheet of glass, a bait (such as shown in Patent 867,948 above mentioned) is dropped into the pool of molten glass in front of the roll. The glass adheres to the bait which is then withdrawn so that the glass draws in a sheet from the pool, the point of sheet formation 16 shifting upward on the roll 4. The glass is thus supplied directly from the layer of molten glass 3 on the roll which rotates continuously. The bait is drawn over the carrier rolls 10 by means of the draw table 11 and clamp bars 12, and the sheet of glass 13 thus started is drawn continuously by said draw table and clamp bars.

It will be seen that the roll 4 provides a gathering and transfer device by which the molten glass is continuously gathered from the pool and transferred or lifted to the drawing point 16, which forms the base of the sheet. The glass is carried upward with the roll faster than it is formed into the sheet, so that a portion of the glass adhering to the roll is carried beyond the sheet around the roll and back to the pool. It will be noted that there is a continuous flow or movement of the glass in an upward and forward direction to the under surface of the sheet 13 and an upward and rearward movement of glass away from the upper surface of the sheet at the base 16. Owing to the viscosity and tenacity of the glass the force of gravity is counteracted so that the base or drawing point 16 may be maintained in substantial horizontal alinement with the sheet. That is, the sheet is drawn horizontally from the point of supply.

The height of the drawing point or base 16 of the sheet above the level of the molten glass 1 is governed by a number of factors, including the speed of the rool 4, the depth to which it is immersed, the speed of drawing, the temperature of the glass 3 on the roll, and the temperature of the glass in the pot 7. Any one or more of these factors may be varied to regulate said drawing point:

I show a variable speed motor geared to the roll 4 and can thereby regulate the speed of the roll. Various other forms of drives might be used, such as change gear boxes or a friction drive, or the roll could be geared to the machine drive through variable speed attachments. The depth of dipping can be regulated by raising or lowering the roll by means of nuts 14 and screws 15. The speed of drawing can be regulated by increasing or decreasing the speed of the draw table 11 and clamp bars 12. The temperature of the glass on the gathering roll may be regulated by means of the fire or wind box 6, and the temperature of the glass 1 in the pot may be regulated by means of the fire in chamber 8.

The roll 4 constantly replenishes the supply at the source of drawing as the drawing proceeds. This supply can be increased or decreased by changing the speed of the roll, the depth of dipping and the temperature of the glass 1. The supply at the source of drawing can thus be regulated to meet the requirements of the sheet 13. Although I have described and shown the roll dipping in the glass in the pot 7 and have also shown the sheet being drawn horizontally from the drawing point 16, it will be understood that the roll could be dipped in molten glass contained in any receptacle; for example, it could be operated in the working end 2 of the melting tank. The pot construction shown is favored because it has proved successful in the process set forth in the coding application of I. W. Colburn, Serial Number 70,927, and has the means for adjusting the temperature of the glass in the pot. Also the sheet 13 can be drawn in any practical direction from the roll.

Variations may be resorted to within the spirit and scope of my invention. The principles of my invention may be applied in drawing glass otherwise than in sheet form or in a continuous sheet.

What I claim is:

1. In an apparatus for drawing a continuous sheet of glass, the combination with means to supply a pool of molten glass, of a gathering roll partly immersed in the molten glass, means for rotating the roll and thereby gathering molten glass on the roll and transferring it to a drawing point, and means to draw the glass in a sheet from said roll in a direction normal to the roll at said drawing point.

2. An apparatus for forming a continuous sheet of glass, comprising a receptacle for molten glass, a rotating roll partly immersed in the glass, and means to draw the glass in a sheet from the roll in a direction normal thereto.

3. In an apparatus for forming a continuous sheet of glass, the combination of a container for molten glass, a lifting device for lifting a portion of the glass to a drawing point, means to draw glass in a sheet from the lifting device at said drawing point in a direction perpendicular to the surface of the lifting device at the drawing point, means for heating the glass on the lifting device, means for operating the lifting device, means for raising and lowering the lifting device, and means for regulating the speed of lifting.

4. In an apparatus for drawing a continuous sheet of glass, the combination of a glass gathering roll rotating in position to gather glass from a molten mass, means for regulating the amount of glass gathered by the roll, means for regulating the temperature of the gathered glass, and means for drawing the glass in a sheet from the upwardly moving surface of the roll and maintaining the drawing point at the roll above the level of said mass, said roll being the sole means for lifting the glass from the mass to said drawing point.

5. In an apparatus for drawing a continuous sheet of glass from a molten mass, the combination of means for heating the mass, a roll partly immersed in the mass, means for rotating the roll whereby glass is gathered thereon, means for regulating the amount of glass gathered on the roll, means for regulating the temperature of the glass on the roll, and means for maintaining a drawing point on the roll and drawing a continuous sheet of glass from the roll at said point in a direction perpendicular to the surface of the roll at said point, the width of the sheet being approximately the length of the roll.

6. The method of drawing a continuous sheet of glass, which consists in causing a surface to move upward from a mass of molten glass and carry glass upward therewith, and drawing glass laterally from a drawing point at said surface above the level of said mass while a portion of the glass is carried upward with said surface beyond the drawing point and away from the upper face of the sheet.

7. The method of drawing a continuous sheet of glass, which consists in moving glass with a conveying surface from a molten mass to a drawing point, and continuously drawing a portion of said moving glass laterally from the drawing point in sheet form while maintaining movement of glass with the conveying surface away from upper face of the sheet and toward the under face of the sheet.

8. The method of drawing a continuous sheet of glass, which consists in transferring glass from a molten mass to a drawing point by a continuously moving surface to which the glass adheres, drawing glass laterally in a continuous sheet from said drawing point, and moving a portion of the surface of the transferred glass away from the upper face of the sheet as the drawing proceeds, while molten glass is supplied to the under face of the sheet.

9. The method which consists in continuously drawing a sheet of glass laterally, continuously and mechanically gathering the glass from a molten mass, and causing continuous movement of glass upward and toward the under face of the sheet and upward and away from the upper face of the sheet, the upwardly moving glass having an unconfined surface merging into the under surface of said sheet.

10. The method which consists in continuously drawing a sheet of glass horizontally, mechanically moving glass upward from a pool of glass to the drawing point, and causing a continuous movement of glass away from the upper face of the sheet back into the pool adjacent the point at which it is withdrawn from the pool.

11. Apparatus for forming a continuous sheet of glass, comprising a receptacle for molten glass, a rotating roll partly immersed in the molten glass, and means to draw the glass horizontally in a sheet from an upwardly moving portion of the roll surface.

12. The combination of means providing an upwardly moving surface of molten or plastic glass, and means to draw glass horizontally in a sheet from said surface, said surface being unconfined below and above the drawing point.

13. The combination of means providing an upwardly moving exposed surface of molten glass, and means to draw glass laterally from said surface at an intermediate point thereof.

14. The combination of means for continuously drawing a sheet of glass horizontally, and means to maintain a continuous supply of molten glass moving vertically at the base of the sheet, said means comprising a rotating roll partly immersed in a pool of glass.

15. In sheet glass forming apparatus, the combination of a gathering device having an upwardly moving surface, means to supply molten glass to said surface for upward movement therewith in a continuous sheet, and means to draw glass horizontally in a continuous sheet from said surface as it moves upward.

16. The combination of means to carry molten glass upward in a continuous sheet from a pool, one surface of the sheet being unconfined and means to draw glass in a sheet from said surface at an intermediate point thereof.

17. The method which consists in providing an upwardly moving surface, causing a sheet of glass to move upwardly on said surface from a pool of molten glass, and drawing a portion of said glass laterally while another portion continues its upward movement beyond the drawing point.

18. The method which consists in causing glass to move upwardly in a continuous sheet from a pool of molten glass, continuously drawing a portion of said sheet transversely, and returning the remaining portion to the pool, said sheet having an exposed and unconfined surface extending from the pool to the drawing point.

19. The method which consists in causing glass to move upwardly in a continuous sheet from a pool of molten glass, deflecting a portion of said upwardly moving glass to a horizontal direction and drawing it in a continuous sheet, and returning the remaining portion to the pool, the upwardly moving glass presenting an unconfined surface extending from the pool upward to and merging into the under surface of the horizontal sheet.

Signed at Toledo, Ohio, this tenth day of March, 1917.

JOSEPH P. CROWLEY.